United States Patent
Cox et al.

(10) Patent No.: US 12,208,570 B2
(45) Date of Patent: *Jan. 28, 2025

(54) 3D PRINTING OF AN INTRAOCULAR LENS HAVING SMOOTH, CURVED SURFACES

(71) Applicant: Alcon Inc., Fribourg (CH)

(72) Inventors: Brian Craig Cox, Arlington, TX (US); Fernando Enrique Ortiz, Fort Worth, TX (US); Austin Xavier Rodeheaver, Arlington, TX (US)

(73) Assignee: Alcon Inc., Fribourg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,914

(22) Filed: Nov. 21, 2023

(65) Prior Publication Data

US 2024/0083106 A1    Mar. 14, 2024

Related U.S. Application Data

(63) Continuation of application No. 17/652,084, filed on Feb. 22, 2022, now Pat. No. 11,897,190, which is a
(Continued)

(51) Int. Cl.
| | |
|---|---|
| *B29C 64/135* | (2017.01) |
| *B29C 64/227* | (2017.01) |
| *B29C 64/245* | (2017.01) |
| *B29C 64/255* | (2017.01) |
| *B29C 64/264* | (2017.01) |
| *B29D 11/00* | (2006.01) |
| *B29D 11/02* | (2006.01) |

(Continued)

(52) U.S. Cl.
CPC .......... *B29C 64/135* (2017.08); *B29C 64/227* (2017.08); *B29C 64/245* (2017.08); *B29C 64/255* (2017.08); *B29C 64/264* (2017.08); *B29D 11/00009* (2013.01); *B29D 11/023* (2013.01); *B33Y 10/00* (2014.12); *B33Y 30/00* (2014.12)

(58) Field of Classification Search
CPC ............................................ B29C 64/124–135
See application file for complete search history.

(56) References Cited

U.S. PATENT DOCUMENTS 11,897,190 B2 *   2/2024   Cox .................... B29C 64/264

FOREIGN PATENT DOCUMENTS

GB            810041 A   *   3/1959

* cited by examiner

Primary Examiner — John J DeRusso
(74) Attorney, Agent, or Firm — Patterson + Sheridan, LLP

(57) ABSTRACT

A continuous additive fabrication system comprises a bath of photopolymer resin and a light source assembly having a light source and a motorized variable aperture. The light source assembly is operable to generate a focus point in the bath of photopolymer resin, the shape of the focus point at a curing plane within the bath of photopolymer resin corresponding to the shape of the motorized variable aperture. The continuous additive fabrication system further comprises a platform configured to support a build object and a drive mechanism (coupled to at least one of the platform and the light source assembly) configured to continuously move the curing plane through the bath of photopolymer resin. A size and/or shape of the motorized variable aperture is changed while the curing plane in continuously moved through the bath of photopolymer resin.

19 Claims, 3 Drawing Sheets

Related U.S. Application Data continuation of application No. 15/920,495, filed on Mar. 14, 2018, now Pat. No. 11,298,874.

(60) Provisional application No. 62/474,658, filed on Mar. 22, 2017.

(51) Int. Cl.
*B33Y 10/00* (2015.01)
*B33Y 30/00* (2015.01)

3D PRINTING OF AN INTRAOCULAR LENS HAVING SMOOTH, CURVED SURFACES

CROSS-REFERENCE TO RELATED APPLICATIONS

This application is a continuation of U.S. patent application Ser. No. 17/652,084, filed Feb. 22, 2022, which is a continuation of U.S. patent application Ser. No. 15/920,495, filed Mar. 14, 2018, now U.S. Pat. No. 11,298,874, which claims priority to U.S. Provisional Application No. 62/474,658, filed Mar. 22, 2017. The entire contents of each of these applications are incorporated by reference in their entirety.

FIELD

This present disclosure relates generally 3D printing and, more particularly, to 3D printing of intraocular lenses having smooth, curved surfaces.

BACKGROUND 3D printing, also known as additive manufacturing, refers to processes used to create a three-dimensional object in which successive layers of material are formed under computer control to create an object. There are several 3D printing processes that differ in the way layers are deposited to create parts and in the materials that are used. Stereolithography (SLA) is a type of 3D printing process that produces layers of a solid part by curing liquid materials using photopolymerization. This is a process by which a vat of liquid polymer is exposed to light, causing chains of molecules to link together and form polymers that comprise one layer of a three-dimensional solid object. A build plate on which the solid object rests, is then moved down in small increments and the liquid polymer is again exposed to light. The process repeats until a model of the object is complete.

Current SLA 3D printers use an image-forming projection system (e.g., a digital micromirror device (DMD), lithography, LCD, raster scan and the like) to project an image on to a particular plane of a photopolymer bath. These systems are meant for creating complex shapes and so require an adaptable image to cure the material. However, most image-forming projection systems utilize pixels to project the image, and thus the projected image has a resolution limitation in a transverse plane related to the pixel size. Additionally, stepper motors for translating the build plane results in the curing of fixed incremental layer steps, resulting in a "stair-stepped" surface finish on the part, instead of a part having smooth surfaces. Due to these limitations, current SLA 3D printers may not be suitable for production of intraocular lenses (IDLs) as the "stair steps" can reduce optical quality and cosmetic appearance.

Accordingly, what is needed is an improved 3D printing system suitable for producing miniature optics, including IDLs, having smooth, continuously curved surfaces.

SUMMARY

In certain embodiments, a continuous additive fabrication system comprises a bath of photopolymer resin and a light source assembly having a light source and a motorized variable aperture. The light source assembly is operable to generate a focus point in the bath of photopolymer resin, the shape of the focus point at a curing plane within the bath of photopolymer resin corresponding to the shape of the motorized variable aperture. The continuous additive fabrication system further comprises a platform configured to support a build object and a drive mechanism (coupled to at least one of the platform and the light source assembly) configured to continuously move the curing plane through the bath of photopolymer resin. A size and/or shape of the motorized variable aperture is changed while the curing plane in continuously moved through the bath of photopolymer resin.

In certain embodiments, a method for continuous additive fabrication comprising generating, via a light source assembly, a focus point in a bath of photopolymer resin, the shape of the focus point at a curing plane within the bath of photopolymer resin corresponding to the shape of a motorized variable aperture of the light source assembly. The method further comprises changing a size and/or shape of the motorized variable aperture while continuously moving the curing plane through the bath of photopolymer resin.

The above-described systems and methods may provide certain advantages over conventional additive manufacturing techniques. For example, the above-described systems and methods may allow for the generation of smooth, high-resolution, optical-quality surfaces, suitable for IOLs.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION

Exemplary embodiments of the present disclosure relate to a continuous additive fabrication system. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

Figure 1:
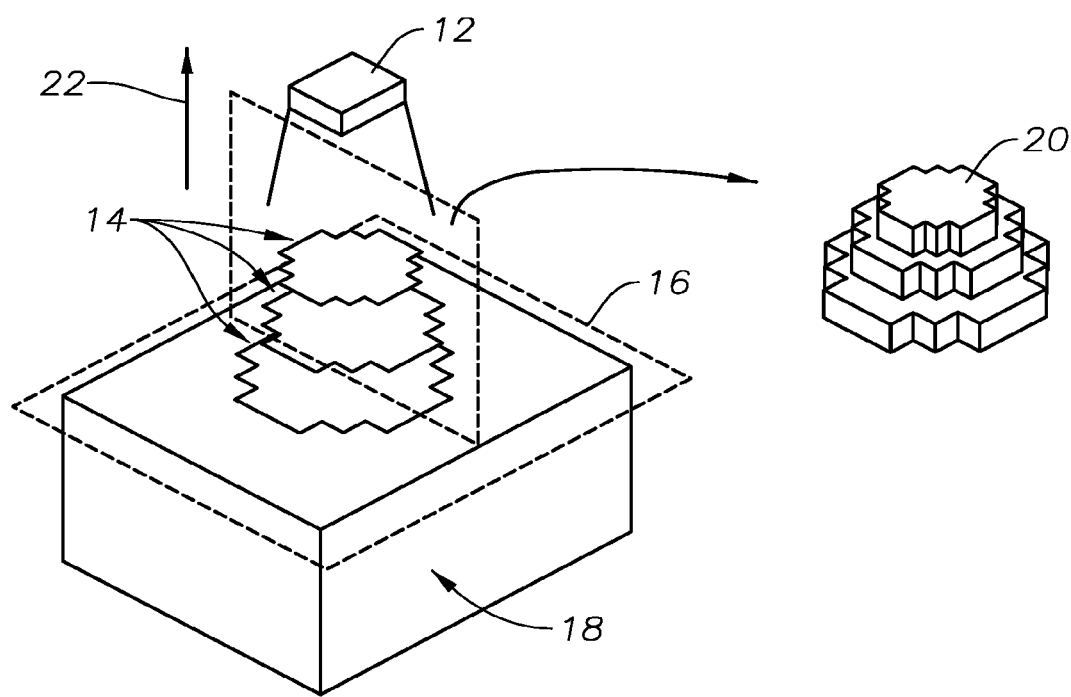
FIG. 1 is a diagram illustrating a portion of an example conventional SLA additive fabrication system.

FIG. 1 is a diagram illustrating a portion of an example conventional SLA additive fabrication system. The example SLA additive fabrication system 10, e.g., a conventional SLA 3D printer, includes a digital micromirror device (DMD) 12 or other image-forming projection system, to project images 14 on to a transverse plane 16 of a bath of photopolymer resin 18. Typically, the images 14 are projected by the DMD 12 by focusing an ultraviolet (UV) light/laser (not shown) on to the transverse plane 16 of photopolymer resin 18. A DMD chip comprises several hundred thousand microscopic mirrors on its surface arranged in an array corresponding to the pixels in the image 14 to be displayed. The ultraviolet light projected by the DMD causes the photosensitive photopolymer to solidify to form a layer of the cured polymer defining the resulting part. However, because the DMD 12 is made up of pixels, the projected images 14 have a resolution limitation in the transverse plane 16 related to the pixel size of the DMD 12, resulting in "stair-stepped" edges of the images 14, as shown.

Additionally, stepper motors (not shown) translate an elevator apparatus or platform up or down in the bath photopolymer resin 18 a distance equal to the thickness of a single layer of the resulting part 20 and the photopolymer is again exposed by the UV light. This process is repeated for each layer of the design until the 3D object is complete.

The use of stepper motors for translating the assembly results in curing fixed incremental layer steps, also resulting in a "stair-stepped" surface finish for each layer of the resulting part 20 in a direction of the motor movement, shown here as the motor movement plane 22. Thus, conventional SLA additive fabrication systems create resulting parts 20 having what could be considered aliasing in both the transverse (or horizontal) direction and the motor (or vertical) direction, instead of parts having smooth surfaces. For an object, such as an intraocular lens (IOL), which is implanted into a human eye, having such aliased surfaces would be unacceptable due to reduced optical quality and cosmetic appearance.

The exemplary embodiments provide an improved continuous additive fabrication method and system that continually moves a curing plane up through a volume of photopolymer resin utilizing a combination of a continuously-driven servo motor for linear positioning with a motorized variable aperture in the light source to create smooth, continuously curved surfaces, which are suitable for intraocular lens (IOL) construction.

Figure 2:
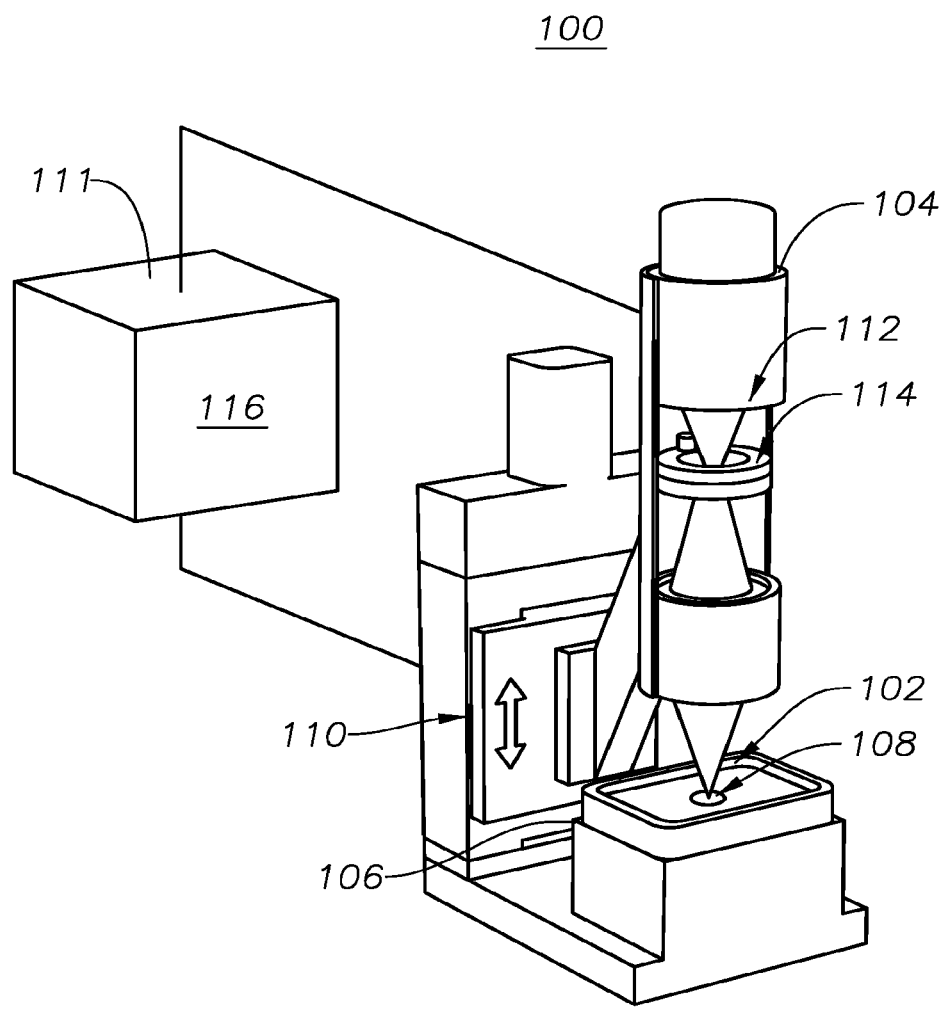
FIG. 2 is a diagram illustrating a continuous additive fabrication system in accordance with exemplary embodiments of the present disclosure.

FIG. 2 is a diagram illustrating a continuous additive fabrication system in accordance with exemplary embodiments of the present disclosure. The continuous additive fabrication system 100 may be implemented as a 3D printer that includes a bath of a photopolymer resin 102, a light source assembly 104, a platform 106 located within the bath of a photopolymer resin 102 that supports cured polymer 108 (the object being built/printed), a drive mechanism 110 coupled to the light source assembly 104 and/or the platform 106, and a processor 111 coupled to the light source assembly 104 and to the drive mechanism 110.

Photopolymer resin 102 may refer to any type of suitable polymerizable liquids, monomers, initiators and combinations thereof. The continuous additive fabrication system 100 may also include a photopolymer resin reservoir (not shown) for replenishing the path of photopolymer resin 102 during the building process.

Drive mechanism 110 may refer to any suitable device for moving light source assembly 104 and/or the platform 106. For example, drive mechanism 110 may comprise one or more a servo motors, electric motors, linear actuators, or any other suitable motor or actuation device.

According to the exemplary embodiments, the light source assembly 104 is provided with a light source 112 and a motorized variable aperture 114. The light source 112 may comprise an ultraviolet (UV) light source and may include conventional optical components (not shown) such as, for example, one or more LEDs, filters, condensers, diffusers, lens tube length adjusters, and the like. Although in the exemplary embodiment discussed above the light source 112 comprises a UV light source, light source 112 may alternatively comprise any suitable type of excitation source (e.g., a light source generating light in the visible or other spectra). Additionally, although in the exemplary embodiment discussed above the light source 112 includes one or more LEDs for generating light, light source 112 may alternatively include any other suitable components for generating light (e.g., incandescent lights, fluorescent lights, phosphorescent or luminescent light, or lasers).

Figure 3:
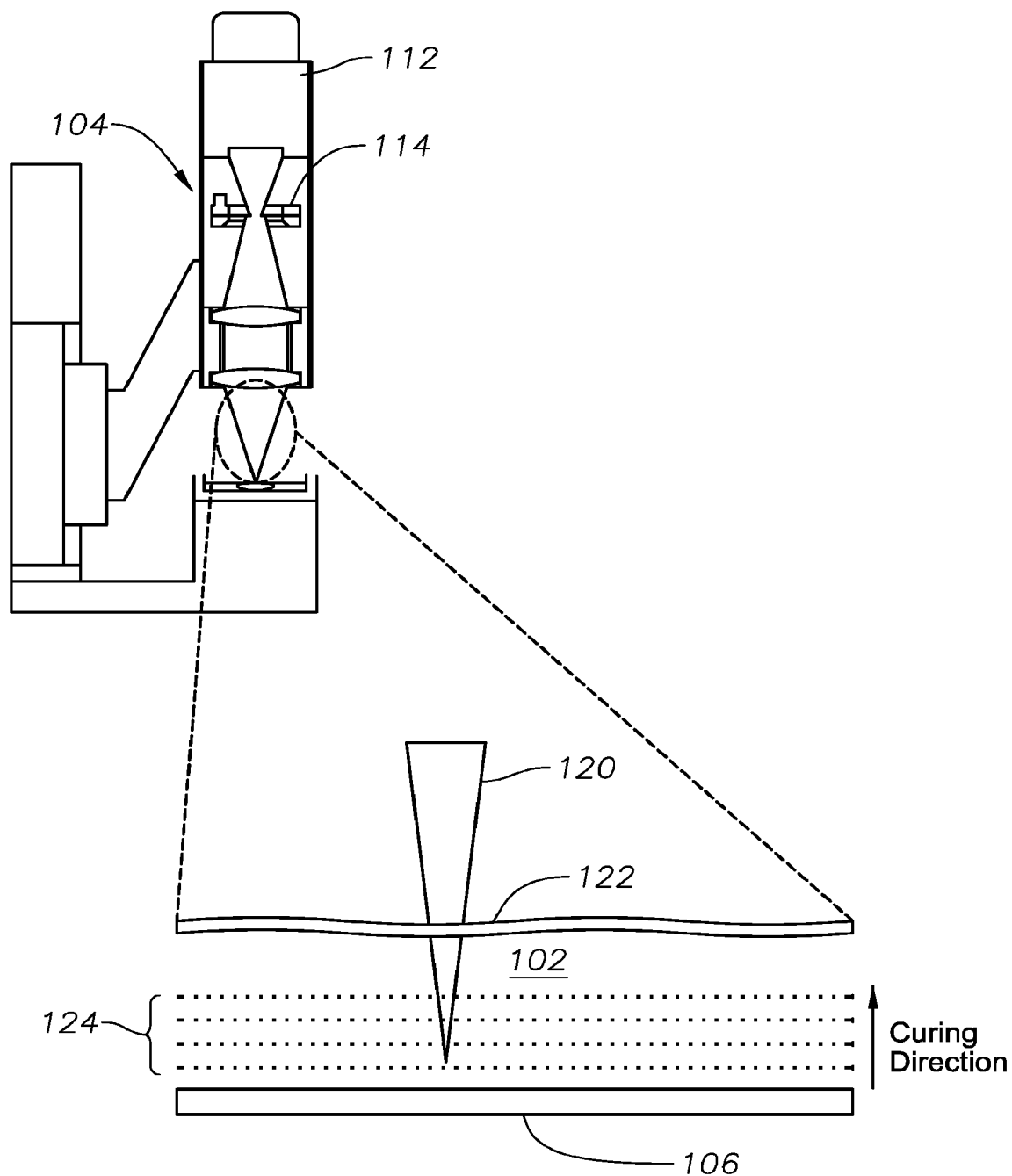
FIG. 3 is a cross-section diagram of light source assembly showing the light source and the motorized variable aperture.

FIG. 3 is a cross-section diagram of the light source assembly 104 showing the light source 112 and the motorized variable aperture 114. Also shown is an enlarged area of the drawing (dashed oval) of the emitted light and the photopolymer resin 102. The light source assembly 104 may be mounted vertically above the photopolymer resin 102 and the light 120 emitted from the light source assembly 104 may have a focus point that defines a curing plane 124 within the photopolymer resin 102. In one embodiment, the focus point may comprise a circular image of the aperture. As discussed in further detail below, adjustment of the variable aperture and continuous movement of the platform 106 relative to the curing plane 124 (or, alternatively, movement of the light source assembly 104 relative to the platform 106) may allow for the generation of parts (e.g., IOLs) having smooth curved surfaces.

Referring now to both FIGS. 2 and 3, during the building process, a processor 111 may execute software instructions, referred to herein as a curing control module 116, and those software instructions may configure the processor 111 to control both the drive mechanism 110 and the light source assembly 104. The processor 111 may control, among other things, a diameter of the motorized variable aperture 114, the intensity of the light 120, and the drive mechanism 110 to adjust a position of the platform 106 and/or the position of the light source assembly 104.

In one embodiment, the processor 111 may initially position the platform 106 at a predetermined depth below the surface 122 of the photopolymer resin 102 and set the focus point of the light 120, and therefore, an initial position of the curing plane 124, a predetermined distance above the platform 106. The predetermined depth at which the platform 106 is initially positioned may be based at least in part on the height of the build object. In one embodiment, a UV-blocker may be used to control the depth of penetration of light 120 into the photopolymer resin 102.

During the building process, the processor 111 may cause the light source assembly 104 to constantly expose the photopolymer resin 102 with projections of the motorized variable aperture onto the curing plane 124 in the photopolymer resin 102. In one embodiment, if the motorized variable aperture is circular in shape, then the projections will be circular as well. Additionally or alternatively, the projection may be modified to produce other shapes as well, such an elliptical shape to produce an asymmetric optic. In certain embodiment, the projections of the motorized variable aperture 114 may be reimaged with a magnification factor onto the curing plane 124.

During the exposure, the processor 111 may cause a change in the diameter of the motorized variable aperture 114 according to a shape of the build object, while continuously moving the curing plane 124 through the bath of photopolymer resin 102. Stated differently, the processor 111 may control a continuous photo-curing process in which continuous movement of the curing plane 124 is synchronized with changes to the diameter of the motorized variable aperture and changes to position of the light 120 emitted from the light source assembly 104 to create a build object having smooth surfaces in both transverse and vertical directions.

In one embodiment, the curing plane 124 may be continuously moved up through the photopolymer resin by continuously moving the light source assembly 104 vertically up and away from the surface 122 of the photopolymer resin 102, thereby moving the curing plane 124 vertically through the photopolymer resin 102 towards the surface 122 of the photopolymer resin 102. In this embodiment, aperture changes may be synchronized with the speed of the drive mechanism 110 and optionally with properties of the light source, while the position of the platform 106 may remain fixed.

In another embodiment, the curing plane 124 may be continuously moved up through the photopolymer resin by continuously changing an optical power of the light source assembly 104 to thereby move the curing plane 124 vertically through the photopolymer resin 102 towards the surface 122 of the photopolymer resin 102. In this embodiment, the optical power of the light source assembly 104 may be reduced, while the position of the platform 106 may remain fixed.

According to yet another embodiment, the curing control module 116 may configure the processor 111 to change the diameter of the motorized variable aperture 114 according to a shape of the build object, while continuously moving the platform 106 vertically away from the surface 122 of the photopolymer resin 102, thereby continuously lowering the build object during the curing process. In this embodiment, aperture changes are synchronized with the speed of the drive mechanism 110 and optionally with properties of the light source, while the position of the curing plane remains fixed.

In one embodiment, the speed at which the curing plane 124 is moved vertically may be fixed or variable, and the speed at which the diameter of the motorized variable aperture 114 is changed is dependent upon the speed of the vertical movement as well as the shape of the build object. Additionally, calculated parameters may be used during the curing process to vary proportional speed of the drive mechanism 110 using calculated curing control parameters to create surfaces (e.g., for IOLs) with spherical, aspherical, or free-form optical surface characteristics. In one embodiment, the curing control parameters input to the curing control module 116 may include an output shape geometry for the build object, an aperture control profile for the motorized variable aperture 114, a motion control profile for the drive mechanism 110, and light source assembly profile for the light source 112. For instance, when creating a hemisphere shape, for example, the speed at which the diameter of the motorized variable aperture 114 is changing would not be constant for a particular speed of the drive mechanism 110. If the drive mechanism 110 is moving at a constant speed to move the light source assembly 104 and/or the platform 106, the control module 116 may alter the diameter of the motorized variable aperture 114 according to an equation defining the output shape geometry.

The above-described processor 111 may be incorporated into the 3D printer or in a computer coupled to the 3D printer. In both embodiments, a memory (not shown) may be coupled to the processor 111. The memory may be used to store software instructions comprising the curing control module 116, as well as the curing control parameters. The processor 111 may be configured to execute the instructions stored in a memory to cause and control the process as described in this disclosure. As used herein, a processor may comprise one or more microprocessors, field-programmable gate arrays (FPGAs), controllers, or any other suitable computing devices or resources, and memory may take the form of volatile or non-volatile memory including, without limitation, magnetic media, optical media, random access memory (RAM), read-only memory (ROM), removable media, or any other suitable memory component. Memory may store instructions for programs and algorithms that, when executed by the processor, implement the functionality described herein with respect to any such processor, memory, or component that includes processing functionality.

A method and system for a continuous additive fabrication system has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Accordingly, many modifications may be made by one of ordinary skill in the art without departing from the spirit and scope of the appended claims.

We claim:

1. A continuous additive fabrication system, comprising:
   a bath of photopolymer resin;
   a light source assembly comprising a light source and a motorized variable aperture, the light source assembly operable to generate a focus point in the bath of photopolymer resin, the focus point defining a curing plane;
   a platform located within the bath of photopolymer resin and configured to support cured polymer comprising a build object; and
   a processor coupled to the light source assembly, the processor being configured to execute software instructions to:
      change an optical power of the light source to cause the curing plane to move through the photopolymer resin, and
      change a diameter of the motorized variable aperture according to a shape of the build object while the curing plane is moved through the bath of photopolymer resin.

2. The continuous additive fabrication system according to claim 1, wherein a position of the platform remains fixed while the optical power of the light source is changed.

3. The continuous additive fabrication system according to claim 1, wherein a rate of the change to the diameter of the motorized variable aperture is synchronized with a speed at which the curing plane is moved through the photopolymer resin.

4. The continuous additive fabrication system according to claim 1, wherein the light source assembly comprises an ultraviolet (UV) light source.

5. The continuous additive fabrication system according to claim 4, further comprising a UV-blocker operable to control a depth of penetration of light produced by the UV light source.

6. The continuous additive fabrication system according to claim 1, wherein the light source assembly is mounted vertically above the bath of photopolymer resin.

7. The continuous additive fabrication system according to claim 1, wherein the platform is initially positioned at a predetermined depth below a surface of the photopolymer resin and an initial position of the curing plane is set at a predetermined distance above the platform.

8. The continuous additive fabrication system according to claim 1, wherein the build object is an intraocular lens having an aspherical surface.

9. The continuous additive fabrication system according to claim 1, wherein a shape of the focus point corresponds to a shape of the motorized variable aperture.

10. A method for continuous additive fabrication, comprising:
   causing, by a processor, a light source assembly to generate a focus point in a bath of photopolymer resin, the focus point defining a curing plane;
   changing, by the processor, an optical power of the light source assembly to cause the curing plane to move through the photopolymer resin; and
   changing, by the processor, a diameter of a motorized variable aperture of the light source assembly according to a shape of a build object while the curing plane is moved through the bath of photopolymer resin.

11. The method of claim 10, wherein the bath of photopolymer resin comprises a platform configured to support cured polymer comprising the build object, and wherein a position of the platform remains fixed while the optical power of the light source assembly is changed.

12. The method of claim 11, further comprising setting an initial position of the curing plane at a predetermined distance above the platform.

13. The method of claim 10, wherein the changing a diameter of the motorized variable aperture comprises synchronizing a rate of change of the diameter with a speed at which the curing plane is moved through the photopolymer resin.

14. The method of claim 10, wherein the build object is an intraocular lens having an aspherical surface.

15. A non-transitory computer readable medium having instructions stored thereon that, when executed by a processor, cause the processor to perform a method for continuous additive fabrication comprising:
   causing a light source assembly to generate a focus point in a bath of photopolymer resin, the focus point defining a curing plane;
   changing an optical power of the light source assembly to cause the curing plane to move through the photopolymer resin; and
   changing a diameter of a motorized variable aperture of the light source assembly according to a shape of a build object while the curing plane is moved through the bath of photopolymer resin.

16. The non-transitory computer readable medium of claim 15, wherein the bath of photopolymer resin comprises a platform configured to support cured polymer comprising the build object, and wherein a position of the platform remains fixed while the optical power of the light source assembly is changed.

17. The non-transitory computer readable medium of claim 16, the method further comprising setting an initial position of the curing plane at a predetermined distance above the platform.

18. The non-transitory computer readable medium of claim 15, wherein the changing a diameter of the motorized variable aperture comprises synchronizing a rate of change of the diameter with a speed at which the curing plane is moved through the photopolymer resin.

19. The non-transitory computer readable medium of claim 15, wherein the build object is an intraocular lens having an aspherical surface.

* * * * *